United States Patent [19]

Stuart

[11] Patent Number: 4,522,363
[45] Date of Patent: Jun. 11, 1985

[54] GRAVITY SELF-ALIGNING ARTICLE MOUNT

[76] Inventor: Clifton F. Stuart, Rte. 1, Box 137, Lynnville, Tenn. 38472

[21] Appl. No.: 409,441

[22] Filed: Aug. 19, 1982

[51] Int. Cl.³ .............................................. F16B 3/08
[52] U.S. Cl. ............................... 248/225.2; 248/218.4; 248/480; 248/544; 362/431
[58] Field of Search ............... 248/225.2, 225.1, 224.3, 248/224.2, 224.1, 220.2, 218.4, 222.1, 466, 473, 475 R, 480, 489, 320, 544; 362/431, 432

[56] References Cited

U.S. PATENT DOCUMENTS

| | | | |
|---|---|---|---|
| 2,195,013 | 3/1940 | Rastetter et al. | 248/222.1 |
| 2,595,752 | 5/1952 | Batts | 248/224.3 |
| 2,750,142 | 6/1956 | McKee | 248/224.2 |
| 2,939,364 | 6/1960 | Doswell et al. | 248/224.1 |
| 3,305,200 | 2/1967 | Avery | 248/224.3 |
| 3,417,886 | 12/1968 | Stuart | 214/145 |
| 3,746,776 | 7/1973 | Monahan et al. | 362/431 |
| 3,861,632 | 1/1975 | Siilats | 248/224.3 |
| 3,881,677 | 5/1975 | Ihlenfeld | 248/224.1 |

Primary Examiner—William H. Schultz
Assistant Examiner—Ramon O. Ramirez
Attorney, Agent, or Firm—Carothers & Carothers

[57] ABSTRACT

A gravity self-aligning article mount for suspension mounting of an article to a support wherein a first mounting bracket is adapted for securement to a support and a second mounting bracket is adapted for securement to an article to be suspended from the support. A vertically-extending horn is secured to upper portions of one of the brackets and an opening is provided in upper portions of the other of said bracket for receiving and seating the horn to hang the article bracket from the support bracket. The brackets have engaging body portions which underlie the aforedescribed horn and opening, and which body portions further respectively have mating convex and concave contoured seating surfaces adapted to gravitationally self-align one of the brackets with the other to vertical after the horn has been engaged in the opening.

8 Claims, 9 Drawing Figures

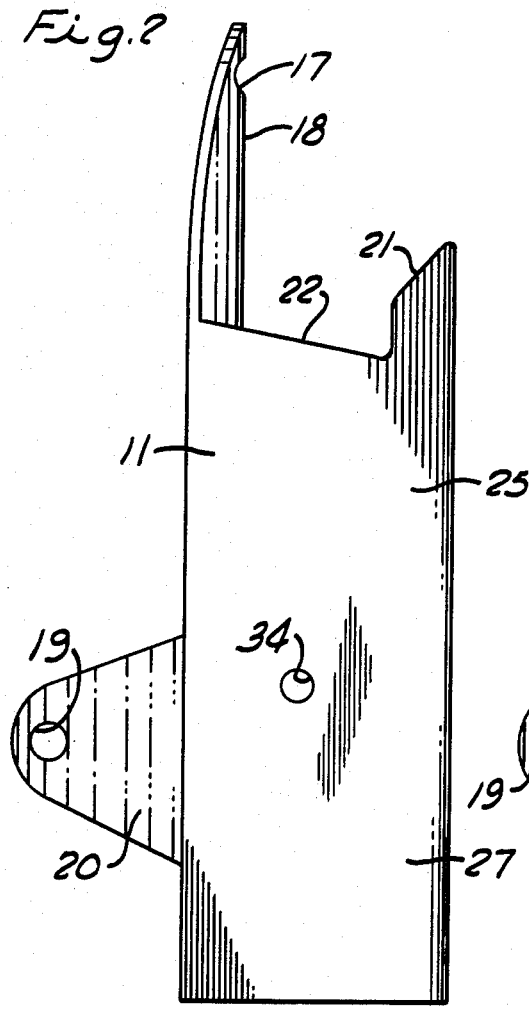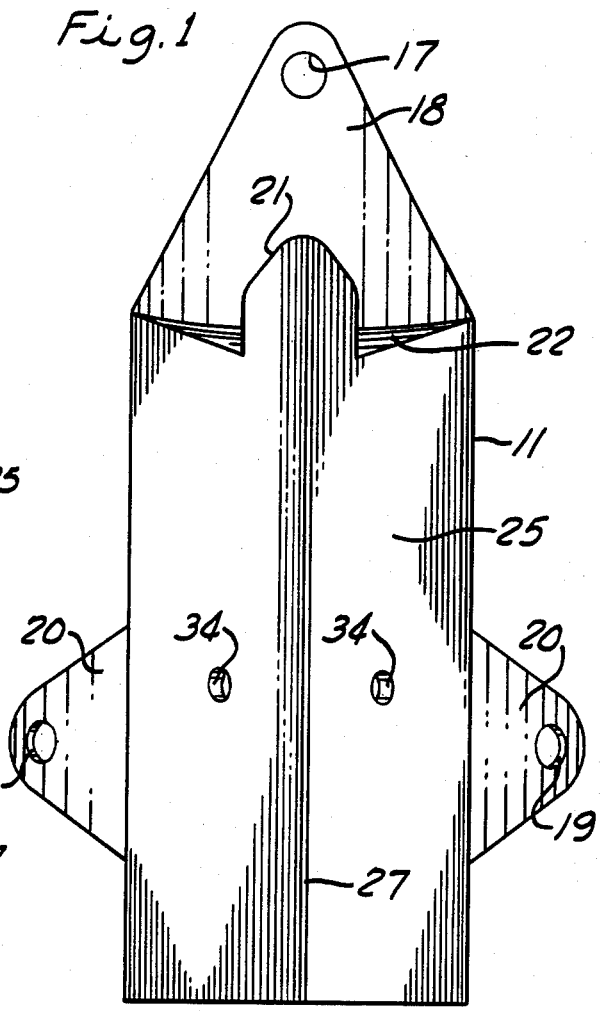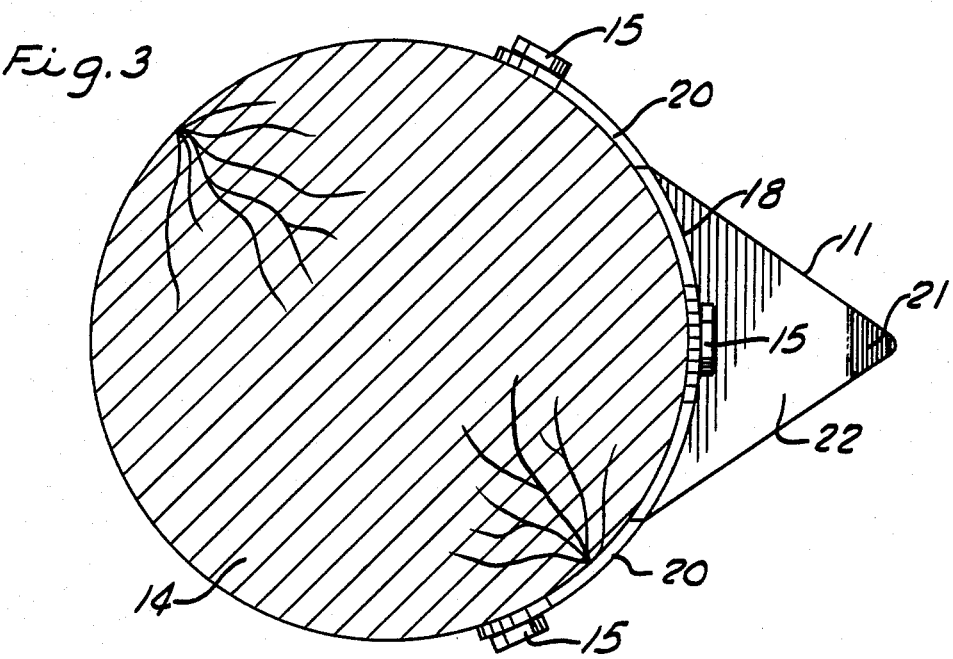

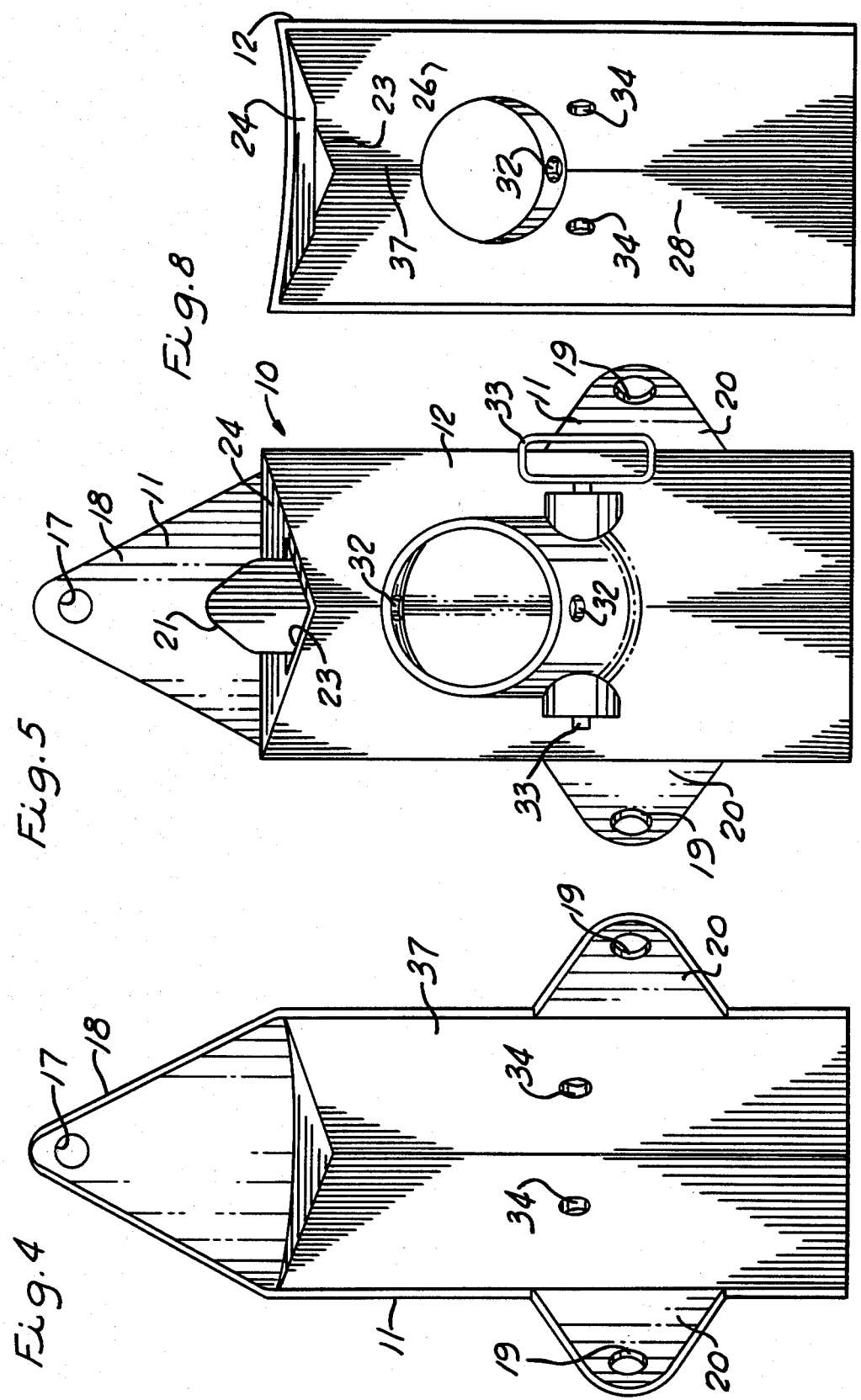

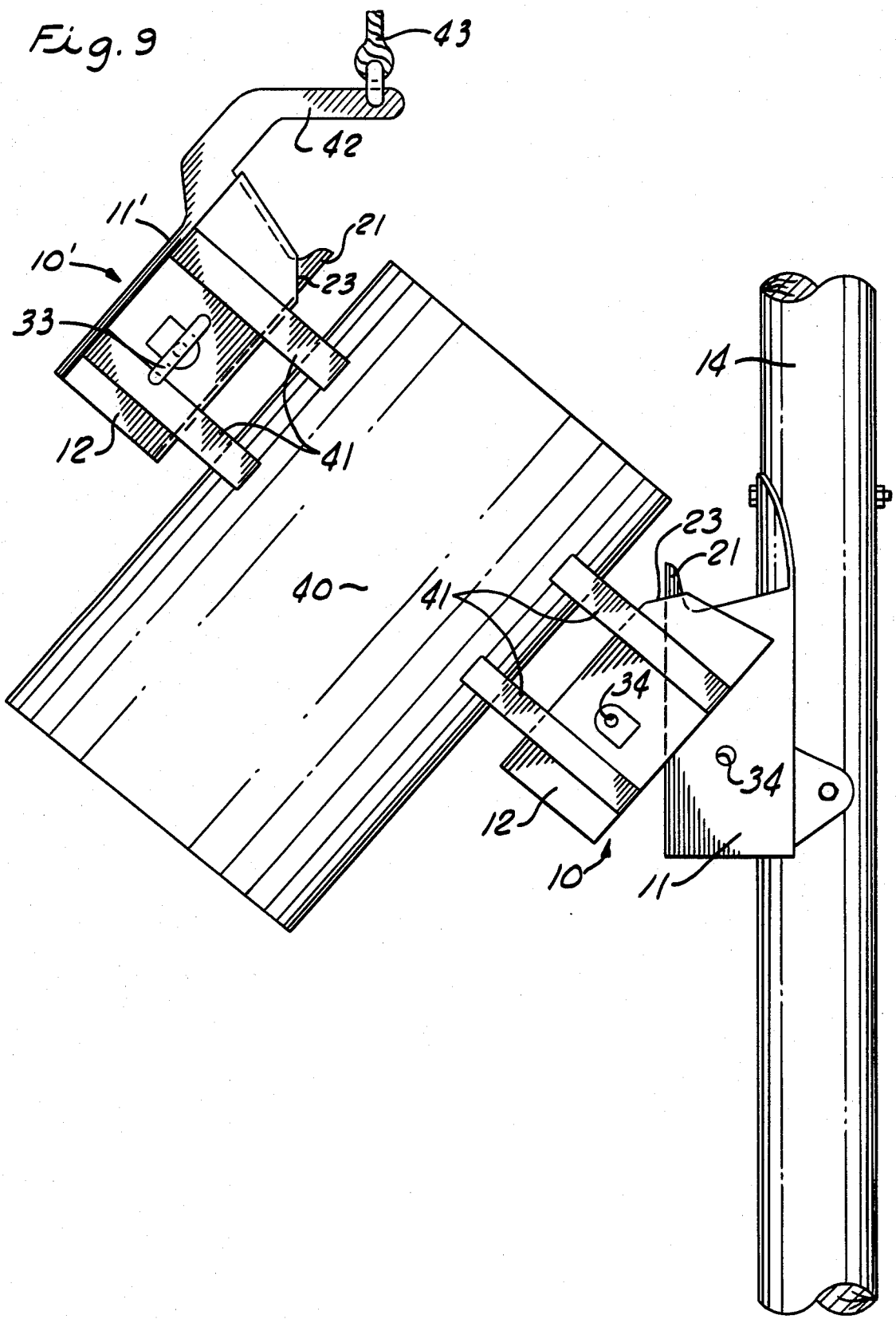

4,522,363

GRAVITY SELF-ALIGNING ARTICLE MOUNT

BACKGROUND OF THE INVENTION

The present invention relates generally to article mounts, and more particularly to a mount for hanging an article to a support wherein the article is automatically aligned to vertical upon initial engagement of the mounting members.

There has been considerable need for an article mount which will automatically align an article being hung on a support to a vertical position, once the mounting brackets have been initially engaged, merely through the gravitational forces of the article itself.

By way of example, many articles, such as transformer cans or kettles, street lamps, etc., are mounted to a telephone pole or a light pole through the use of a simple bracket which is rigidly secured to the article being hung from the pole, and which bracket is generally provided with a plurality of mounting holes. In order to hang the article to the pole, the entire article together with its integrally attached bracket must be raised and held to position and the holes in the bracket aligned with corresponding holes in the pole, through which bolts are thereafter inserted and secured. This is a very awkward and time consuming task which is not particularly safe and requires the assistance of more than one laborer. Thus, the overall mounting or dismounting of an article such as a lamp or kettle, from a pole, becomes not only time consuming but extremely expensive due to the large amount of manpower required. There is no quick or easy way presently on the market to mount and dismount articles from a pole, or other support. Additionally, it is difficult to insure proper vertical alignment of the article on the support when making the initial mounting.

By way of an additional example, many articles must be hung from a suspension support, such as a cable. For example, traffic lights are many times suspended from cables, or a cable is suspended from underneath a helicopter to support and carry an article away with the helicopter. In these situations, there is no foolproof and easy method for mounting and dismounting the article from the suspension support, and particularly with the application wherein a helicopter is utilized, there is need for improvement in mounts or couplings to provide a fast, efficient and secure way of coupling the bottom end of a cable suspended from the moving helicopter to an object or article on the ground to be picked up and carried away.

By way of even further example, a mounting bracket or coupling is sorely needed for the quick mounting and dismounting of different articles from the same support, while insuring that proper vertical alignment of the article with the support is being made. For example, it is desirable to be able to hang pictures on a wall in a very easy and quick fashion, and to maintain the picture in proper vertical alignment on the wall. Present picture hangers or mounts, permit the picture to become misaligned or crooked on the wall.

Another example of this latter type mounting requirement arises in the situation wherein a tractor or loader must be quickly able to attach many different appropriate implements, such as a bucket, scraper, forklift, dozer blade, or the like. Connections and disconnections of the implement must be made rapidly, and it must be insured that the implement is securely mounted in the proper vertical position with the tractor or loader. The present state of the prior art with regard to connecting such implements to a tractor is illustrated in my U.S. Pat. No. 3,417,886, which issued on Dec. 24, 1968 and is entitled "Implement Hitch For Tractors and Loaders".

The hitch disclosed in this Patent is very effective, yet it does have some shortcomings. Due to the configuration of this hitch, when an implement is being coupled to the tractor and the implement is not vertically aligned, the hitch disclosed in this Patent will force vertical alignment of the implement with the tractor, but many times this requires extra maneuvering and manipulating of the implement against the ground surface or another object with the tractor lift mechanism to induce the implement to settle down on its mount after initial engagement between the tractor and the implement. Many times the implement will not vertically self-align with the tractor upon initial coupling engagement simply through the weight or gravitational effects of the implement hanging on the front or back end of the tractor or loader.

It is a principal object of the present invention to provide a universal type article mount for suspension mounting of an article to a support wherein it is insured that the article will always drop into proper vertical alignment with the support upon initial engagement of the mounting brackets, thus providing a gravity self-aligning article mount which is foolproof and safe.

The gravity self-aligning article mount of the present invention for suspension mounting of an article to a support comprises in general a first mounting bracket adapted for securement to the support and a second mounting bracket adapted for securement to the article to be suspended from the support. The second mounting bracket is adapted for mating suspension engagement with the first mounting bracket. A vertically extending projection or horn is secured to upper portions of one of these brackets, and an opening in the upper portions of the other bracket is provided for receiving and seating the horn to hang the article bracket from the support bracket. The two brackets have engaging body portions which underlie the aforedescribed horn and opening, and these body portions are respectively provided with mating concave and convex contoured seating surfaces, which are adapted to gravitationally self-align one of the brackets with the other to vertical after the horn of one bracket has been engaged in the opening of the other bracket. Thus, once the horn at the upper portions of one bracket has been initially engaged into the opening at the upper portions of the other bracket, the gravitational weight of the article itself will cause the two brackets to automatically seat one with the other without further adjustment or maneuvering such that the article is forced to hang vertically as the lower body portions of the bracket are contoured such that the convex surface contour of one is matingly engaged with and received in the concave contour of the other bracket member, forcing the bracket members to automatically seat and align with each other.

With the configuration of the mount of the present invention, one bracket member may be simply dropped or lowered with a suspension line or cable onto the other bracket member, or one bracket member may be raised upwardly with a line or cable support or a lifting member such as the lifting arms of a tractor or loader to initially engage the other bracket member, causing the article being suspended to automatically self-align itself and seat, all without undue maneuvering and with little prealignment required. The only prealignment required is the mere initial engagement of the aforedescribed horn of one bracket with the opening of the other bracket.

Once the two bracket members comprising the article mount are in seating engagement, they may be readily and easily locked together by a securing means, such as by securing a pin received through transversely aligned openings in the contoured lower surfaces of the bracket members.

The same article mount of the present invention also may be utilized not only for hanging an article on a support, but may further be utilized to suspend an article to be moved or mounted from a cable or line which is depending downwardly from a boom, such as a crane boom.

Other objects and advantages appear in the following description and claims.

The accompanying drawings show, for the purpose of exemplification without limiting the invention or the claims thereto, certain practical embodiments illustrating the principles of this invention wherein:

FIG. 1 is a view in front elevation of a male bracket member constituting one of two bracket members making up the article mount of the present invention.

FIG. 2 is a view in side elevation of the bracket member shown in FIG. 1.

FIG. 3 is a top or plan view of the bracket member shown in FIG. 1 and further illustrating the bracket member as being secured to a light pole shown in cross section.

FIG. 4 is a view in rear elevation of the bracket member shown in FIG. 1.

FIG. 5 is a view in front elevation illustrating one embodiment of the article mount of the present invention wherein a second or mating female bracket member is illustrated in engagement with the bracket member shown in FIG. 1.

FIG. 8 is a view in rear elevation of the female bracket member only of the article mount combination shown in FIG. 5.

FIG. 9 is a view in side elevation of two article mounts of the present invention as shown in the previous Figures, and illustrating their use in mounting a power transformer or kettle to a light pole with the use of a boom cable.

Figure 7:
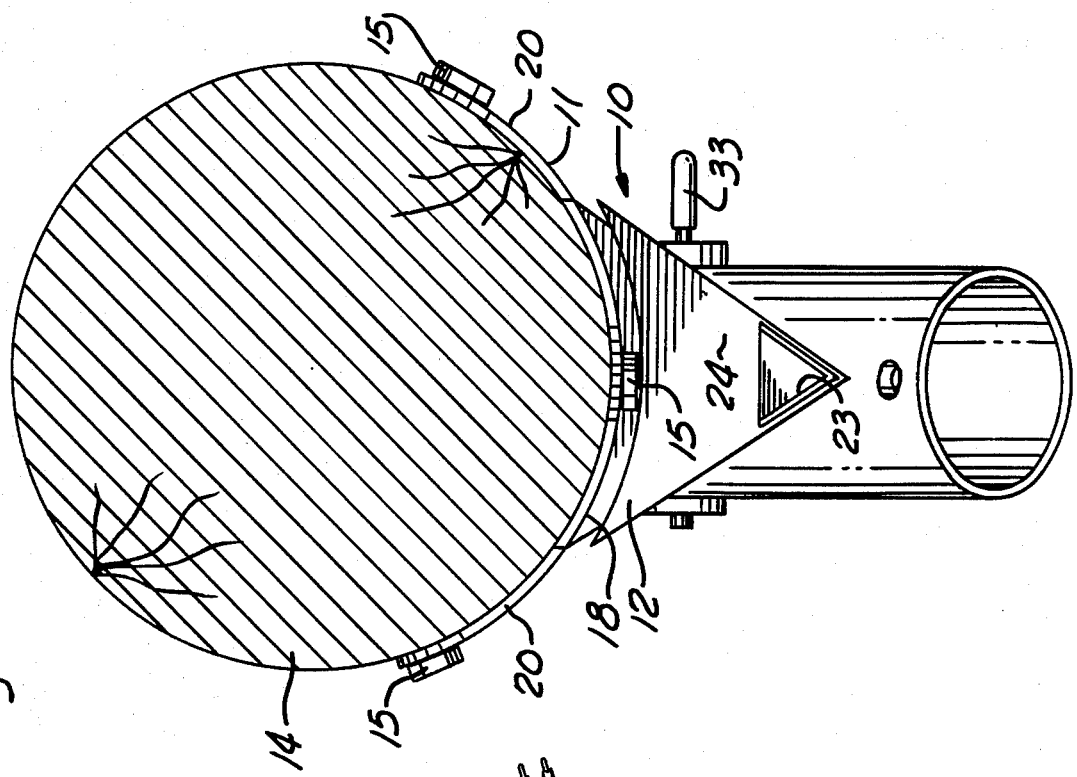
FIG. 7 is a top or plan view of the article mount illustrated in FIG. 6 and further illustrating the article mount as being mounted to a light pole shown in cross section.

One embodiment of the gravity self-aligning article mount of the present invention is illustrated in FIGS. 1 through 8. The article mount 10 of the present invention is illustrated in complete form in FIGS. 5, 6 and 7, and the mount 10 is comprised of two interengaging bracket members, mainly, male bracket member 11 and female bracket member 12. A rear view of female bracket 12 is further illustrated in FIG. 8 and multiple views of the male bracket 11 alone, without engagement of female bracket member 12, are shown in FIGS. 1 through 4.

Figure 6:
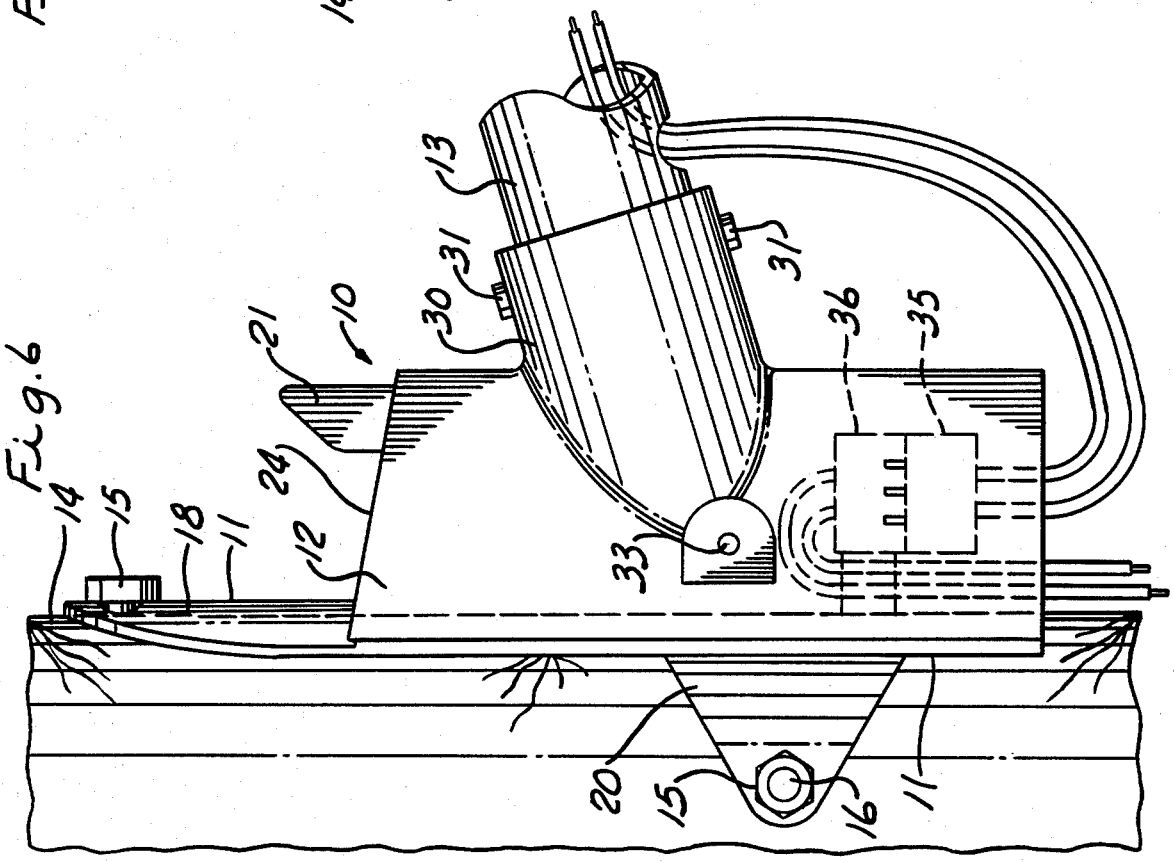
FIG. 6 is a view in side elevation of the article mount shown in FIG. 5 and further illustrating the article mount as being mounted to a light pole as a support.

Generally referring to FIGS. 1 through 8, the gravity self-aligning article mount 10 of the present invention is illustrated in the form of a hanging support for a street lamp, as indicated by the tubular street lamp base 13 in FIG. 6, from a conventional wood light pole 14. The male bracket member 11 is secured by conventional lag screws or bolts, or lag studs and machine nuts, in a conventional manner, as indicated by nuts 15 which are secured to threaded studs 16, which in turn pass through eyes 17 of upper ear 18 and eyes 19 of lower side ears 20 of male mounting bracket member 11.

Male bracket member 11 is provided with a vertically extending horn 21 extending from the upper body portions of bracket member 11. Inclined saddle surface 22 is provided at the base of horn 21.

Female bracket member 12 is provided with a corresponding opening 23 at its upper body portion for receiving and feeding horn 21 therein as particularly indicated in FIGS. 5, 6 and 7, with the upper inclined seating surface 24 of bracket member 12 resting or riding in saddle 22 in order to hang the article bracket 12 from the support brackets 11.

As may be seen from these Figures, brackets 11 and 12 have engaging body portions 25 and 26 respectively, which further respectively underlie or are below horn 21 and opening 23. The lower body portion 25 of male bracket member 11 is provided with the prism-shaped convex contoured seating surface 27 which is engageable and mates with the prism-shaped concave contoured seating surface 28 of female or article bracket 12.

Thus, in mounting street lamp 13 to light pole 14, bracket member 11 is first mounted to pole 14 as previously described, by one who either climbs the pole or mounts the bracket from a conventional hydraulic platform lift operated from the rear of a vehicle. Then the tubular lamp base 13 of the street lamp is secured in tubular mounting socket 30 of female or article member 12, and secured with screws or bolts 31, which pass through openings 32. This is best illustrated in FIG. 6. Once this is accomplished, then lamp base 13 together with female bracket 12 are raised to position on the pole by any convenient means, such as manually or by suspending it from a boom line or cable. Once bracket member 12 is raised to position, opening 23 of bracket member 12 is initially lowered over the top of vertically extending horn 21, and at this point, the lifting support for bracket member 12 and lamp 13 may be released and the gravity thereof will automatically cause concave surface 28 to engage and mate or seat on convex-contoured surface 27, thereby self-aligning bracket member 12 to vertical. As may be seen from the contours or configurations of bracket members 11 and 12, no further manipulation or maneuvering of bracket member 12 is required in order to properly seat bracket member 12 with bracket member 11.

After the bracket members are seated, they may be further secured together by the insertion of securing pin 33 through transversely aligned openings 34 in or through contoured surfaces 27 and 28 of bracket members 11 and 12 respectively. Once this has been accomplished, then the individual mounting the lamp fixture can make electrical connection to the lamp base 13 by plugging male electrical plug 35 (see FIG. 6) into female socket 36, which is housed within the protective confines of the hollow interior 37 (see FIG. 4) of male bracket member 11.

With prior art methods of mounting a street lamp to a ligh pole, at least two persons are generally required to mount the lamp to a light pole, or to dismount a lamp from a light pole, whereas with the article mount of the present invention, the task may be easily and quickly carried out by one person. With prior art methods, the pole mount is not made in two parts, but rather is a unitary mount to which the lamp is already secured, and it becomes extremely awkward for one to hold the lamp fixture up with the attached mount and align it with the light pole mounting bolts and secure the same.

The article mount of the present invention also provides a very great convenience when the article, such as the street lamp base 13, must be dismounted. With the article mount of the present invention, it is not necessary to remove nuts 15 or bracket member 11. One simply slides out retaining pin 33 and lifts the lamp base 13 together with bracket member 12 off of bracket member 11.

Also, article mount 10 is not only self-aligning, in a failsafe fashion, but in addition, it is very easy to initially guide vertical horn 21 of bracket member 11 into upper opening 23 of bracket member 12, as the upper tip of projection or horn 21 may be readily slid up the interior corner 37 (FIG. 8) such that it is easily guided directly into opening 23.

The respective concave and convex mating seating surfaces 28 and 27 of bracket members 12 and 11 are shown to be in the form of a prism. However, other concave and convex mating surfaces may be employed which will accomplish the same results. For example, it is possible that these surfaces could be configured as conical. The principal object is that these lower body surfaces are configured to always force the article being suspended to a vertical position, or to a vertically-aligned position, merely due to the gravitational forces of the article and article bracket after initial engagement of the horn 21 with the opening 23.

Also, the article mount 10 is herein illustrated as supporting a street lamp. However, the mount may be utilized for mounting any object, and may be made of any size. For example, the same mounting mechanism can be utilized to hang pictures on a wall, to hang cans or kettles on a light pole, to support an implement such as a bucket, boom or forklift, etc., from a tractor or loader; the same mounting bracket may also be utilized to pick up and suspend an object from the free bottom end of a cable, the top end of which might be secured to a crane boom or a helicopter. This latter mentioned application is better understood with reference to FIG. 9 which illustrates a transformer kettle or can 40 in the process of being mounted to light pole 14 through the use of two self-aligning article mounts 10 and 10' of the present invention. The article mount 10 is identical to that disclosed in FIGS. 1 through 8, with the exception that bracket member 12 in this instance is secured to article or can 40 instead of a street lamp by means of welded support brackets 41.

Article mount 10' is also identical with that illustrated in FIGS. 1 through 8, with the exception that again bracket member 12 is secured to can 40 and bracket member 11' is provided with an upper hook extension 42, the upper end of which is pivotally secured to the bottom end of a cable 43 which is suspended from the end of a boom for maneuvering can 40 and lowering the opening 23 over the horn 21 in article mount 10. Once this initial engagement is made as indicated in the Figure, cable 43 is lowered to a slack position at which point bracket member 12 of article mount 10 will be automatically seated with bracket member 11 (as previously illustrated in FIG. 6), such that can 40 is automatically vertically aligned. At this point in the mounting operation, an individual then slides pin 33 out of article mount 10' and inserts it into article mount 10, and the mounting operation is completed and hook bracket member 11' may then be lowered away from bracket member 12 of article mount 10'. Bracket member 12 remains secured to can 40 so that the operation may be reversed easily, and the can 40 readily removed from support or pole 14. Also, by having a bracket member 12 on both sides of can 40, it is obvious that either side of can 40 may be mounted to pole 14.

As alternative embodiments of the mount 10 of the present invention, the lower mating surfaces of bracket members 11 and 12 may be reversed such that bracket member 12 could be provided with the convex surface and bracket member 11 could be provided with the concave surface. Also, opening 23 could be provided in bracket member 11 instead of in bracket member 12 and then the vertically extending horn 21 could extend vertically down instead of up in the form of a hook to engage the opening in the upper portion of bracket member 11.

It should also be pointed out that, particularly with reference to FIG. 9, the article mount 10 of the present invention readily permits articles to be mounted to a support by suspending them from a line or cable such as illustrated in FIG. 9. This permits a swing or drift to the article being mounted, and the article may be readily lowered to engage the article mount 10 together with minimum possibility of damage to the support or to the article being mounted to the support. To the contrary, if one were to attempt to raise the article 40 as rigidly secured by a hydraulic implement attached to the front of a tractor or loader, damage could readily occur to the support 14 or the article 40 due to the very excessive forces which can inadvertently be exerted by the hydraulic system of the tractor implement against the support when trying to properly position the article for initial engagement of the support members 11 and 12. This mounting procedure is safer overall than former procedures, with less likelihood of injury to person and property.

I claim:

1. In an article mount for suspension mounting of an article to a support, including, a first mounting bracket adapted for securement to a support and a second mounting bracket adapted for securement to an article to be suspended from said support and for mating suspension engagement with said first bracket, a vertically extending horn secured to upper portions of one of the brackets and an opening in upper portions of the other of said brackets for receiving and seating the horn to hang the article bracket from the support bracket, the improvement comprising, said brackets having engaging body portions which underly said horn and opening and which body portions further respectively have mating convex and concave contoured seating surfaces adapted to gravitationally self-align one of said brackets with the other to vertical after said horn has been engaged in said opening.

2. The gravity self-aligning article mount of claim 1, including securing means for securing said brackets together after they are in seating engagement.

3. The gravity self-aligning article mount of claim 2, wherein said securing means consists of a securing pin received through transversely aligned openings in said contoured surfaces.

4. The gravity self-aligning article mount of claim 1, wherein said first mounting bracket is secured to a support and said second mounting bracket is secured to an article, and means for movably suspending and lowering said article to engage said horn with said opening.

5. The gravity self-aligning article mount of claim 4, said means for movably suspending said article including a cable supporting said article with hook means from above.

6. The gravity self-aligning article mount of claim 5, said hook means consisting of a second set of said self-aligning mounting brackets with one of said brackets secured to said cable and the other bracket secured to said article.

7. The gravity self-aligning article mount of claim 6, said hook means engaging a side of said article opposite from the side said second bracket is secured to said article.

8. The gravity self-aligning article mount of claim 1, including a support and an article to be mounted on said support, said first and second mounting brackets respectively secured to said support and article.

* * * * *